United States Patent [19]

Inoue et al.

[11] Patent Number: 4,782,528
[45] Date of Patent: Nov. 1, 1988

[54] TELEPHONE APPARATUS

[75] Inventors: Hidetoshi Inoue; Yasunobu Taguchi; Teruo Baba, all of Tokyo, Japan

[73] Assignee: Oki Electric Industry Co., Ltd., Tokyo, Japan

[21] Appl. No.: 913,759

[22] Filed: Sep. 30, 1986

[30] Foreign Application Priority Data

Sep. 19, 1986 [JP] Japan .................. 61-142522[U]

[51] Int. Cl.⁴ .................................... H04M 1/04
[52] U.S. Cl. .......................... 379/455; 379/433; 403/327
[58] Field of Search .............. 379/433, 434, 435, 437, 379/440, 446, 451, 455, 454, 428, 424, 426, 448, 58; D14/52, 56, 53, 59, 65; 292/163, 140; 403/327, 328, 330

[56] References Cited

U.S. PATENT DOCUMENTS

| | | |
|---|---|---|
| D. 283,127 | 3/1986 | Hai-Ping ................. 379/434 |
| 3,073,911 | 5/1960 | Mattke et al. ............ 379/435 |
| 3,557,322 | 1/1971 | Walden .................... 379/455 |
| 4,117,276 | 9/1978 | Zurawski ................. 379/433 |
| 4,472,606 | 9/1984 | Krolopp et al. .......... 379/455 |
| 4,609,790 | 9/1986 | Kaiwa et al. . | |

FOREIGN PATENT DOCUMENTS 3542424 6/1987 Fed. Rep. of Germany ...... 379/454
2150396 6/1985 United Kingdom .

OTHER PUBLICATIONS

Irving, "Handset Latch and Delatch System", Motorola Technical Developments, vol. 3, Mar. 1983.

Primary Examiner—Jin F. Ng
Assistant Examiner—Randall S. Vaas
Attorney, Agent, or Firm—Spencer & Frank

[57] ABSTRACT

In a telephone apparatus comprising a locking arrangement for holding a handset on a base unit, protrusion members are provided on the base unit so as to confront and outer inner sides of the receiver part of the handset. When the handset is mounted on the base unit, one of the protrusion members being movable, engagement parts provided on the outer and the inner sides of the receiver part engage the protrusion members. The movable protrusion member is resiliently held and retracted by abutment and sliding with the receiver part as the handset is lifted off the base unit and as the handset is mounted onto the base unit.

6 Claims, 2 Drawing Sheets

TELEPHONE APPARATUS

BACKGROUND OF THE INVENTION

The present invention relates to a telephone apparatus, and particularly to an improved locking arrangement for a handset suitable for use in an environment where the telephone apparatus is subject to vibration, impact or the like. An example of such a telephone apparatus is a mobile radio telephone apparatus.

A telephone apparatus which is subject to vibration, impact or the like is required to securely hold the handset on the base unit. If the handset is detached from the base unit, the telephone apparatus will be in the state of hook-on so that reception is disabled. Moreover, the detached handset may collide with some other structure and may be damaged. In addition, it may form an obstacle to the proper operation of the vehicle. Another consideration is that the handset must be lifted off and mounted onto the base unit, usually by a single hand and by a simple manipulation. This requirement is particularly important in connection with a mobile telephone apparatus.

Examples of solutions to those problems are disclosed in the U.S. Pat. No. 4,117,276 and the British patent Application Publication No. 2,150,396.

Here, the U.S. Pat. No. 4,117,276 is taken as an example and is discussed. The telephone apparatus disclosed in this patent is shown in FIGS. 2 and 3. For mounting the handset 1, the heel (transmitter part) of the handset 1 is inserted in a recessed part 3 of a base unit 2, and then the head (receiver part) of the handset 1 is inserted into a recessed part 4. As the head is inserted, a boss 6 of a lever 5 is pushed. When the head has been inserted, the boss 6 slides into a recess in the head.

The lever 5 is pivotally mounted at a pivot point 7. When the boss 6 is pushed, the lever 5 is rotated in the direction of the arrow A and causes a second lever 9 to rotate about a pivot 10, the second lever 9 being connected to the lever 5 via a link bar 8. The second lever 9 is biased by a coil spring 13 (FIG. 2) in the direction of the arrow B (FIG. 3). By this biasing force, the boss 6 slides into the recess in the head.

To detach the handset 1, a button 12 is pushed, to rotate the lever 9, coupled via a spring 11 to the button 12, in the direction opposite to the arrow B, and thereby to rotate the lever 5 in the direction of the arrow A, so that the boss 6 is retracted. As a result, the recess in the head is released from the boss 6, so that it is now possible to lift the handset off the base unit.

However, the above-described telephone apparatus has a disadvantage in that it is necessary to lift the handset while pushing the button 12, so that handling or manipulation is difficult. Another disadvantage of the prior art telephone apparatus is that the locking mechanism is complicated.

Another prior art telephone apparatus as disclosed in the British Patent Application Publication No. 2,150,396 has similar problems.

SUMMARY OF THE INVENTION

An object of the invention is to provide a telephone apparatus which can be easily handled or manipulated.

Another object of the invention is to provide a telephone apparatus having a locking mechanism which is not complicated.

These objectives are achieved by providing a telephone apparatus comprising a handset and a base unit. The handset consists of receiver and transmitter parts, one of the receiver and transmitter parts including outer and inner engagement members thereon. The base unit, which receives the handset, includes a housing, fixed and movable protrusion members and support means for the movable protrusion member. When the handset is mounted on the base unit, the fixed protrusion member engages the outer engagement member and the movable protrusion member engages the inner engagement member.

The movable protrusion member comprises a flange portion and an abutment portion which projects from the flange portion. The abutment portion has upper and lower inclined surfaces which converge toward a tip adapted for slidable movement within an opening in the housing, the flange portion of the movable protrusion member abutting the periphery of the opening in the housing.

The handset is lifted off the base unit by rotating it away from the unit about the fixed protrusion member which causes the movable protrusion member to be rotatably retracted against a force exerted by a compression spring located within the housing. Retraction of the movable protrusion member occurs when one of the inclined surfaces of the member presses against the inner engagement member while at the same time one side of the flange portion of the movable protrusion member pivots on the periphery of the opening in the housing.

The handset is replaced on the base unit by engaging the outer engagement member with the fixed protrusion member and then rotating the handset about the fixed protrusion member toward the base. This causes the movable protrusion member to be retracted against the force exerted by the compression spring as the other inclined surface of the movable protrusion member presses against the inner engagement member and the opposite side of the flange portion of the movable protrusion member presses against the periphery of the opening. The abutment portion of the movable protrusion member is forced by the compression spring into engagement with the inner engagement member when the handset is seated on the base unit.

With the above-described arrangement, the handset is held by engagement between a pair of protrusion members of the base unit and the engagement parts of the handset, so that undesirable detachment of the handset, due to vibration or the like, can be avoided, Moreover, as at least one of the protrusion members is resiliently supported and can be retracted by abutment and sliding with the surface of the receiver part, i.e., by cam action, the handset can be easily detached by simply lifting the handset, that is without the necessity of pressing a button as in the prior art telephone apparatus.

DETAILED DESCRIPTION OF THE PREFERRED EMBODIMENTS

Figure 1:
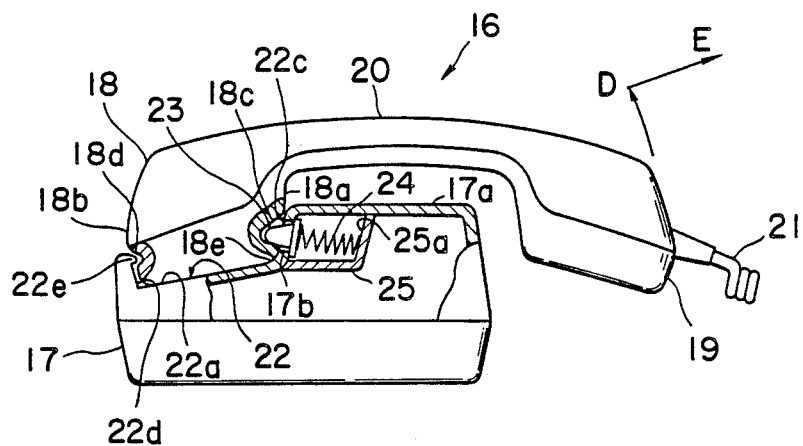
FIG. 1 is a side view, partially in section, showing a telephone apparatus of an embodiment of the invention.
Figure 2:
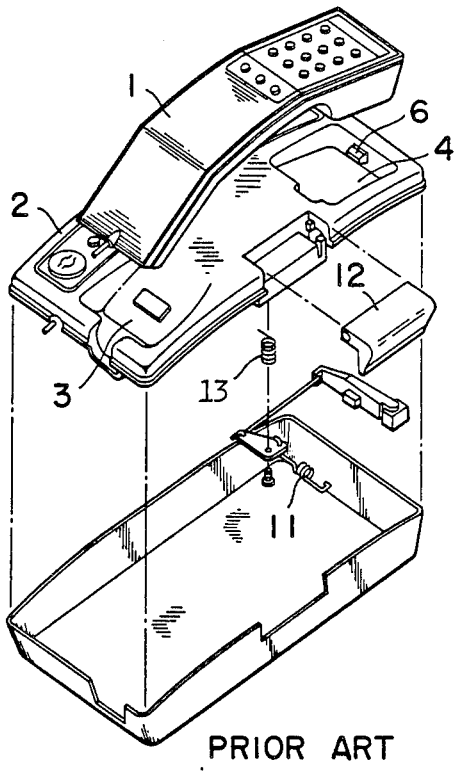
FIG. 2 is an exploded view showing a prior art telephone apparatus.
Figure 3:
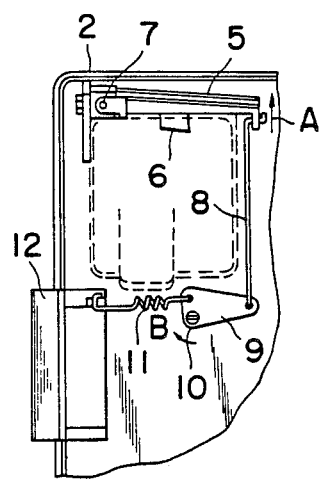
FIG. 3 is a partial bottom view showing the prior art telephone apparatus of FIG. 2.
Figure 4:
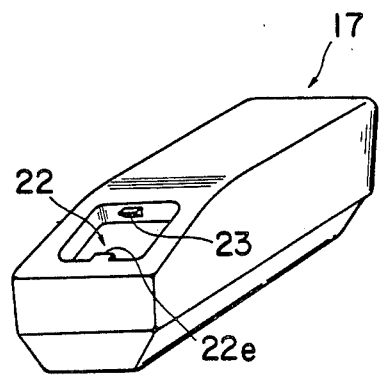
FIG. 4 is a perspective view showing the base unit of the telephone apparatus of FIG. 1.

As illustrated in FIG. 1, a telephone apparatus of an embodiment of the invention comprises a handset 16 and a base unit or a cradle 17. The handset 16 comprises a receiver part 18, a transmitter part 19 and a body part 20 joining the receiver part 18 and the transmitter part 19. A cord 21 led out of the transmitter part 19 electrically connects the handset 16 with the base unit 17.

The receiver part 18 is provided with a dent 18c on its inner side 18a and a dent 18d on its outer side 18b.

A housing 17a of the base unit 17 has a recess 22 on its upper surface. The recess 22 is for receiving the receiver part 18 and is formed to conform to the shape of the receiver part 18. The recess 22 has a bottom surface 22a and wall parts, including an inner wall part 22c and an outer wall part 22d, rising from the periphery of the bottom surface 22a. The inner wall part 22c confronts the inner side 18a of the receiver part 18. The outer wall parts 22d confronts the outer side 18b of the receiver part 18.

Formed on the outer wall part 22d is a tapered protrusion 22e. The protrusion 22e engages the dent 18d on the outer side 18b of the receiver part 18.

Figure 5:
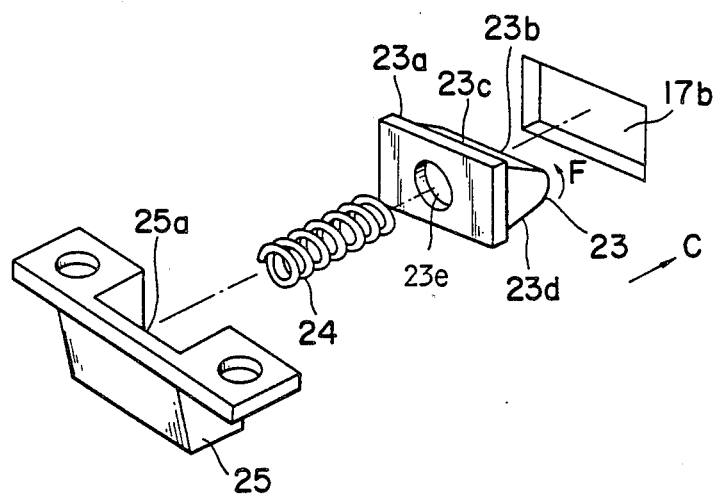
FIG. 5 is an exploded view of a hook and supporting arrangement therefor incorporated in the telephone apparatus of FIG. 1.

Provided in the inner wall 22c is a rectangular opening 17b through a housing 17a. A hook 23 is provided to penetrate through the opening 17b, and is movable into and out of the housing 17a, i.e., in the direction substantially perpendicular to the direction of the movement of the confronting surface of the receiver part 18 during the process of insertion into and removal out of the recess 22. The hook 23 is biased by a compression coil spring 24 in the direction of the arrow C, i.e., from the inside to the outside of the housing 17a. As is better illustrated in FIG. 5, one end of the spring 24 is inserted in a hole 23e on the rear side of the hook 23 and the other end of the spring 24 is in abutment with the inner end surface 25a of a hook cover 25 fixed to the inner surface of the housing 17a. The hook 23 has a flange part 23a which abuts on the inner surface of the housing 17a at the periphery of the opening 17b.

The hook 23 has a pair of inclined surfaces 23c and 23d converging toward its tip 23b. These inclined surfaces 23c and 23d are, in the embodiment illustrated, gradually curved surfaces.

In a state when the handset 16 is mounted on the base unit 17, the hook 23 and the protrusion 22e are in engagement with the dents 18c and 18d, respectively.

To detach the handset 16 from the base unit 17, the handset 16 is rotated counterclockwise in FIG. 1, i.e., in the direction of the arrow D, about the engagement part between the dent 18d and the protrusion member 22e. Then, by the abutment between the upwardly-facing surface of the dent 18c and the downwardly facing inclined surface 23d of the hook 23, the hook 23 is rotated slightly in the direction of the arrow F in FIG. 5, and by the abutment and sliding, i.e., by cam action between the upwardly-facing surface of the dent 18c and the downwardly-facing inclined surface 23d, the hook 23 is retracted against the biasing force of the spring 24 and the engagement between the dent 18c and the hook 23 is released. After that, the handset is moved in the direction in which the dent 18d is separated from the protrusion member 22e, i.e., in the direction of the arrow E. As a result, the engagement between the dent 18d and the protrusion 22e is also released, so that the handset 16 is now in a state in which it can be moved freely. The movement in the direction of the arrow D and the movement in the direction of the arrow E can be made to take place substantially concurrently.

To mount the handset 16 onto the base unit 17, the dent 18d is first brought into engagement with the protrusion 22e. For this to be achieved, the lower surface of the receiver part 18 is made to abut on the bottom surface 22a of the recess 22 and is slid toward the outer wall part 22d, i.e., in the direction opposite to the arrow E, until the dent 18d engages the protrusion 22e. After that, the handset 16 is rotated, about this engagement part, clockwise as viewed in FIG. 1, i.e., in the direction opposite to the arrow D. During the rotation, by the abutment between the upwardly-facing inclined surface 23c of the hook 23 and the surface of the receiver part 18, particularly the curved surface 18e bridging the lower surface and the inner side surface of the receiver part 18, the hook 23 is rotated a little in the direction opposite to the arrow F, and by the abutment and sliding between these surfaces, the hook 23 is retracted against the biasing force of the spring 24. When the lower surface of the receiver part comes into contact with the bottom surface 22a of the recess 22, and the dent 18c comes into confrontation with the hook 23, the hook 23 projects into the dent 18c so that the hook 23 is in engagement with the dent 18c. As a result, the handset 16 is securely held on the base unit 17.

The movement in the direction opposite to the arrow D and the movement in the direction opposite to the arrow E may be made to take place substantially concurrently.

In the state where the handset 16 is mounted on the base unit 17, the downwardly-facing inclined surface 23d of the hook 23 is in intimate contact with the upwardly facing surface of the dent 18c. Accordingly, even when the telephone apparatus as a whole is vibrated, there will occur very little relative vibration between the handset and the base unit because of the intimate contact between the downwardly-facing inclined surface 23d of the hook 23 and the upwardly-facing surface of the dent 18c (and the intimate contact between the lower surface of the receiver part 18 and the bottom surface 22e and the engagement between the dent 18d and the protrusion 22e). As the contact is more intimate, i.e., as the clearance between the downwardly-facing inclined surface 23d of the hook 23 and the confronting surface of the dent 18c is smaller, the relative vibration can be reduced.

It may be so arranged that the downwardly-facing inclined surface 23d of the hook 23 is pressed against the confronting surface of the dent 18c.

The present invention is not limited to a mobile telephone apparatus. For instance, it is applicable to a marine telephone apparatus, a wall telephone apparatus, or a portable telephone apparatus.

It should be understood that the expression referring to the directions such as "lower", "bottom" do not indicate the absolute directions.

As has been described, according to the present invention, the handset is held by engagement between protrusion members confronting the inner side and the outer side of the receiver part and the engagement parts on the receiver part, so that the handset is securely held. Moreover, at least one of the protrusion members is movable and is retracted by the cam action between the movable protrusion member and the surface of the engagement part as well as other surfaces of the receiver part, so that the mounting and detachment of the handset can be achieved by simple manipulation. In addition, if the handset is held only at the receiver part as in the embodiment described, the base unit can be made shorter than the handset. Furthermore, if the movable protrusion member is formed of a hook and a spring in the manner as in the embodiment described, the construction of the locking arrangement is simplified.

What is claimed is:

1. A telephone apparatus comprising
    a handset having a receiver part and a transmitter part, one of said receiver and transmitter parts including outer and inner sides having outer and inner engagement members respectively thereon; and
    a base unit for receiving said handset, said base unit including
        a housing having an inside and an outside;
        a fixed protrusion member for engaging said outer engagement member and a movable protrusion member for engaging said inner engagement member when said handset is mounted on said base unit, said movable protrusion member comprising a flange portion having first and second coplanar opposite sides and an abutment portion extending therefrom, said abutment portion having first and second opposite inclined surfaces converging toward a tip which projects through an opening in said housing to the outside thereof, the opening in said housing having a periphery; and
        support means including a compression spring for resiliently supporting said movable protrusion member within said housing and urging the tip of the abutment portion thereof through the opening in said housing and the flange portion thereof against the periphery of said opening;
    whereby said handset is lifted off said base unit by rotating it away from said base unit about said fixed protrusion member thereby causing said movable protrusion member to be rotatably retracted against the force exerted by said compression spring as the result of the first inclined surface of said movable protrusion member being pressed against said inner engagement member and the first side of the flange portion of said movable protrusion member being pivoted about a first pivot point on the periphery of the opening in said housing; said handset being replaced on said base unit by engaging said outer engagement member with said fixed protrusion member and rotating said handset toward said base unit thereby causing said movable protrusion member to be retracted against the force exerted by said compression spring as the second inclined surface of said movable protrusion member presses against said inner engagement member and the second side of the flange portion of said movable protrusion member pivots about a second pivot point located opposite said first pivot point on the periphery of the opening in said housing; the abutment portion of said movable protrusion member being forced by said compression spring into engagement with said inner engagement member when said handset is seated on said base unit.

2. An apparatus according to claim 1, wherein said receiver part is provided with said outer and inner sides having said outer and inner engagement members thereon.

3. An apparatus according to claim 1, wherein said first inclined surface on the abutment portion of said movable protrusion member is pressed into intimate contact with a corresponding portion of said inner engagement member when said handset is mounted on said base unit.

4. An apparatus according to claim 1 wherein said base unit is provided with a recessed portion having a bottom surface for receiving said receiver part, wall means extending from the periphery of said bottom surface, and wherein said fixed and movable protrusion members are provided on said wall means.

5. An apparatus according to claim 1, wherein at least one of the engagement members comprises a dent provided on the side of the receiver part.

6. An apparatus according to claim 1, wherein
    said base unit has a receiving surface for receiving said handset,
    said engagement member on the outer side of said receiver part comprises a dent, and
    said fixed protrusion member corresponding to said dent is tapered,
    whereby said dent and said tapered fixed protrusion member are brought into engagement with each other by sliding said receiver part into abutment with the receiving surface of said base unit.

* * * * *